(12) United States Patent
Lee et al.

(10) Patent No.: US 7,994,654 B2
(45) Date of Patent: Aug. 9, 2011

(54) WIRELESS-CONTROLLED POWER-SAVING APPARATUS

(75) Inventors: Yu-Lung Lee, Nanjhuang Township, Miaoli County (TW); Ming-Chou Kuo, Taipei (TW)

(73) Assignee: Powertech Industrial Co., Ltd., Chung Ho (TW)

( * ) Notice: Subject to any disclaimer, the term of this patent is extended or adjusted under 35 U.S.C. 154(b) by 293 days.

(21) Appl. No.: 12/417,977

(22) Filed: Apr. 3, 2009

(65) Prior Publication Data

US 2010/0164284 A1 Jul. 1, 2010

(30) Foreign Application Priority Data

Dec. 31, 2008 (TW) .............................. 97151573 A

(51) Int. Cl.
*H02J 3/14* (2006.01)
(52) U.S. Cl. ........................................................ 307/39
(58) Field of Classification Search .............. 307/38–42; 174/494
See application file for complete search history.

(56) References Cited

U.S. PATENT DOCUMENTS

| 5,424,903 | A  | * | 6/1995  | Schreiber       | 361/166 |
| 6,741,442 | B1 | * | 5/2004  | McNally et al.  | 361/166 |
| 7,274,303 | B2 | * | 9/2007  | Dresti et al.   | 340/12.3 |
| 7,705,484 | B2 | * | 4/2010  | Horst           | 307/35 |
| 7,843,081 | B2 | * | 11/2010 | Lim             | 307/39 |

* cited by examiner

*Primary Examiner* — Albert W Paladini
(74) *Attorney, Agent, or Firm* — C. G. Mersereau; Nikolai & Mersereau, P.A.

(57) ABSTRACT

A wireless-controlled power-saving apparatus is disclosed. The apparatus particularly includes a power-saving control strip and a wireless power-detection controller. The power-saving control strip has a master socket and at least one slave socket to be controlled. The strip further includes a receptacle for containing the wireless power-detection controller. More, the wireless power-detection controller connects to an external host for detecting the performance thereof. When the external host boots up, the wireless power-detection controller controls the slave socket to be powered. Or otherwise, when the external host shuts down, the wireless power-detection controller controls the slave socket to be disconnected. Thus the invention achieves the sockets mounted on the power-saving control strip to function a wireless master-slave-correlation operation.

20 Claims, 6 Drawing Sheets

WIRELESS-CONTROLLED POWER-SAVING APPARATUS

BACKGROUND OF THE INVENTION

1. Field of the Invention

The present invention relates generally to a wireless-controlled power-saving apparatus, and more particularly to the apparatus to be controlled remotely by means of a wireless communication technology.

2. Description of Related Art

Since people seriously consider how they use the appliances more convenient, safer and more economical, the extended power lines are often used. There are many kinds of the extended power lines with sockets sold on the market. The extended power line may be a line controlled by a single switch, a line having sockets being controlled by individual switches, or a wireless-controlled extended power line.

Reference is made to FIG. 1 showing an external schematic diagram of a single-switch extended line. This single-switch extended line 1 (the continuously-controlled type) has a plug 10, an extended line 12 and a body 14. The body 14 is disposing of multiple sockets 142 and a switch 144. The sockets 142 are controlled by the switch 144. When the switch is turned on, the alternating power is guided to the plug 10. After that, by way of the extended line 12 and turned-on switch 144, the power is delivered to each socket 142 for use of the appliances. As to the common users, it may not contribute its safety and power-saving by the single-switch extended line 1.

Recently a wireless means used to control the extended line develops on the market. The outward appearance of this wireless-controlled extended line is shown in FIG. 2. A receiver 30, which receives a control signal S1 sent remotely, is disposed in the extended line 3. A socket 32 disposed on the extended line 3 is controlled to be powered or disconnected by referring to the control signal S1. Thus the extended line 3 may control if the appliance connected to the socket 32 is supplied with power. However, this extended line 3 cannot achieve power-saving since it only controls whether the appliance is powered, but not controls a kind of the master-slave-correlation operation.

SUMMARY OF THE INVENTION

In view of the conventional technologies, in contradistinction, the wireless-controlled power-saving apparatus of the invention integrates a power-saving control strip and a wireless power-detection controller. Therein the power-saving control strip includes a master socket and at least one slave socket. Further, the wireless power-detection controller employs wireless communication technology to control the remote power-saving control strip, so as to implement a master-slave-correlation operation.

The power-saving control strip of the present invention is communicated with a wireless power-detection controller. The strip at least has a housing, a communication module, and a microprocessor. The housing is disposing of a master socket and at least one slave socket. The communication module disposed in the housing receives a wireless control signal from the wireless power-detection controller. The microprocessor disposed in the housing is coupled with the communication module and the slave sockets. In response to the wireless control signal, the microprocessor controls the slave sockets to be powered or to be disconnected at one time.

The mentioned wireless power-detection controller is communicated with the power-saving control strip. The controller is equipped with a signal-transmission connecting port, a power-detection unit, and a communication processing unit. The signal-transmission connecting port is interconnected between the wireless power-detection controller and an external host. Therein the power-detection unit couples to the signal-transmission connecting port, whereby to detect whether the external host boots up through the connecting port and to output a detection signal therefor. More, the communication processing unit couples to the power-detection unit, which is used to receive the detection signal. In response to the detection signal, the communication processing unit outputs a wireless control signal to the power-saving control strip.

When the external host boots up, the communication processing unit outputs the wireless control signal to the power-saving control strip in response to the detection signal. In the meantime, the microprocessor of the power-saving control strip, in response to the wireless control signal, controls the slave sockets to be powered simultaneously. Otherwise, when the external host shuts down, the communication processing unit outputs the wireless control signal to the power-saving control strip in response to the detection signal. In response to the wireless control signal, the microprocessor of the power-saving control strip controls the slave sockets to be disconnected. Those steps implement the strip's master-slave-correlation operation.

Therefore, the wireless-controlled power-saving apparatus may contribute its convenience, safety and power-saving, so as to meet a standby-power standard.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
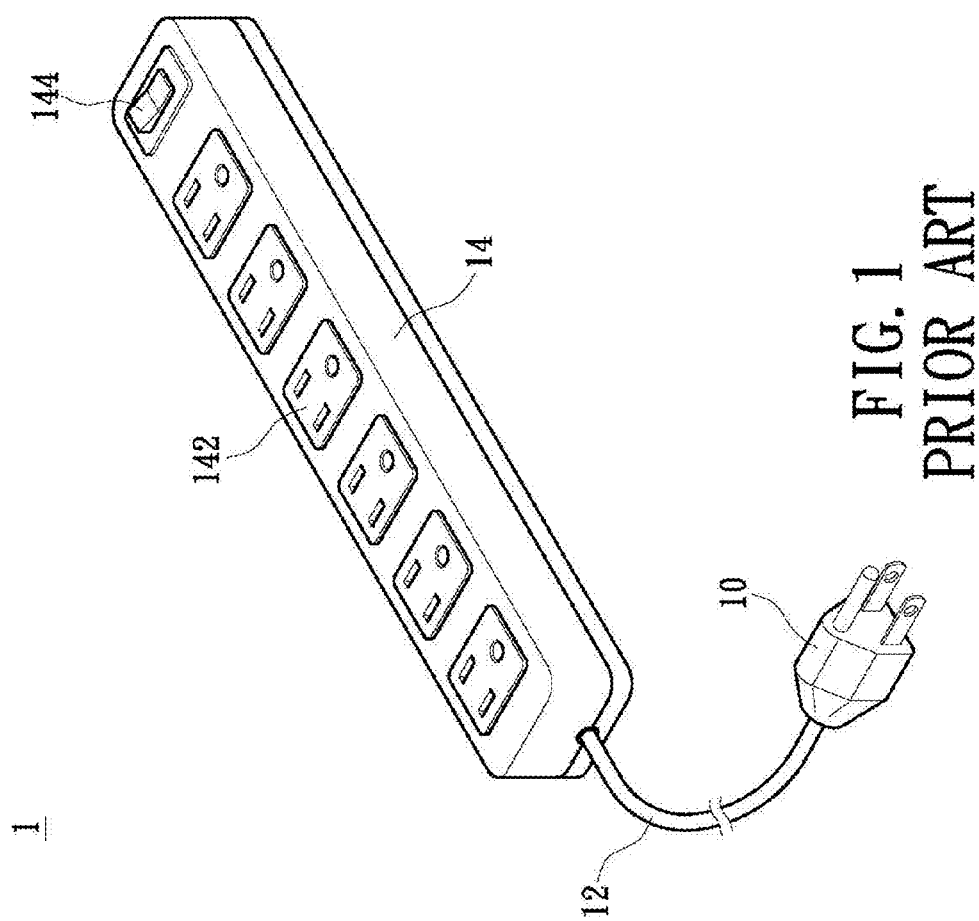
FIG. 1 shows an outward appearance of a conventional extended single-switch control line.
Figure 2:
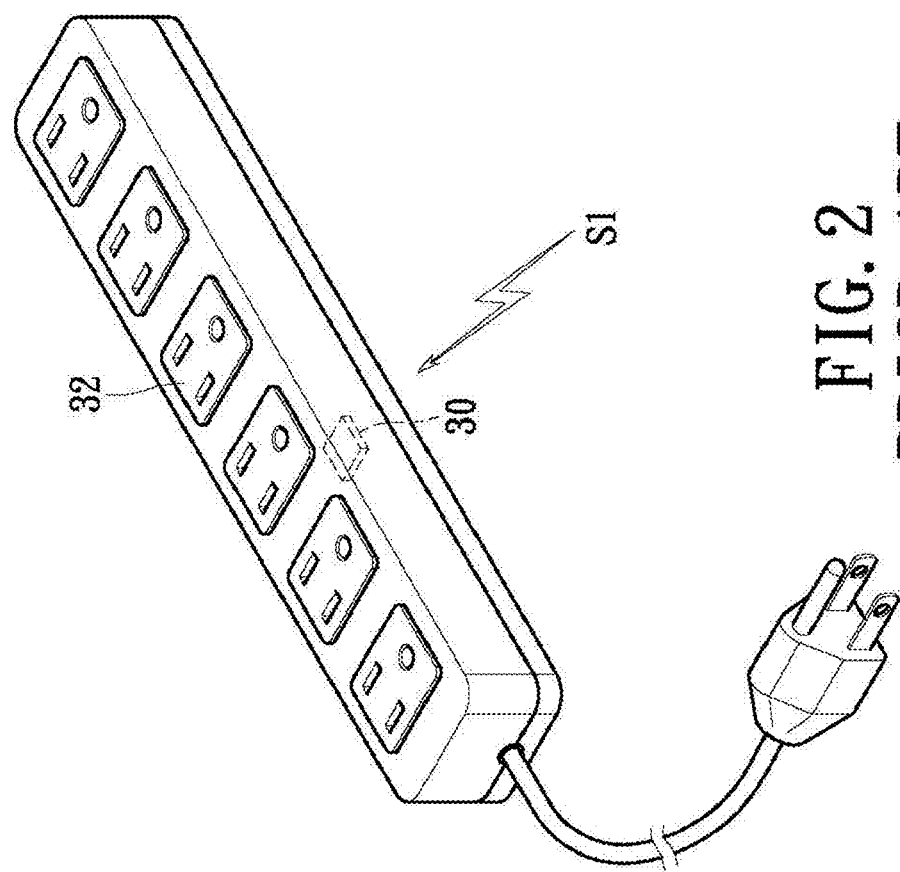
FIG. 2 shows an outward appearance of a conventional extended wireless-controlled control line.
Figure 3:
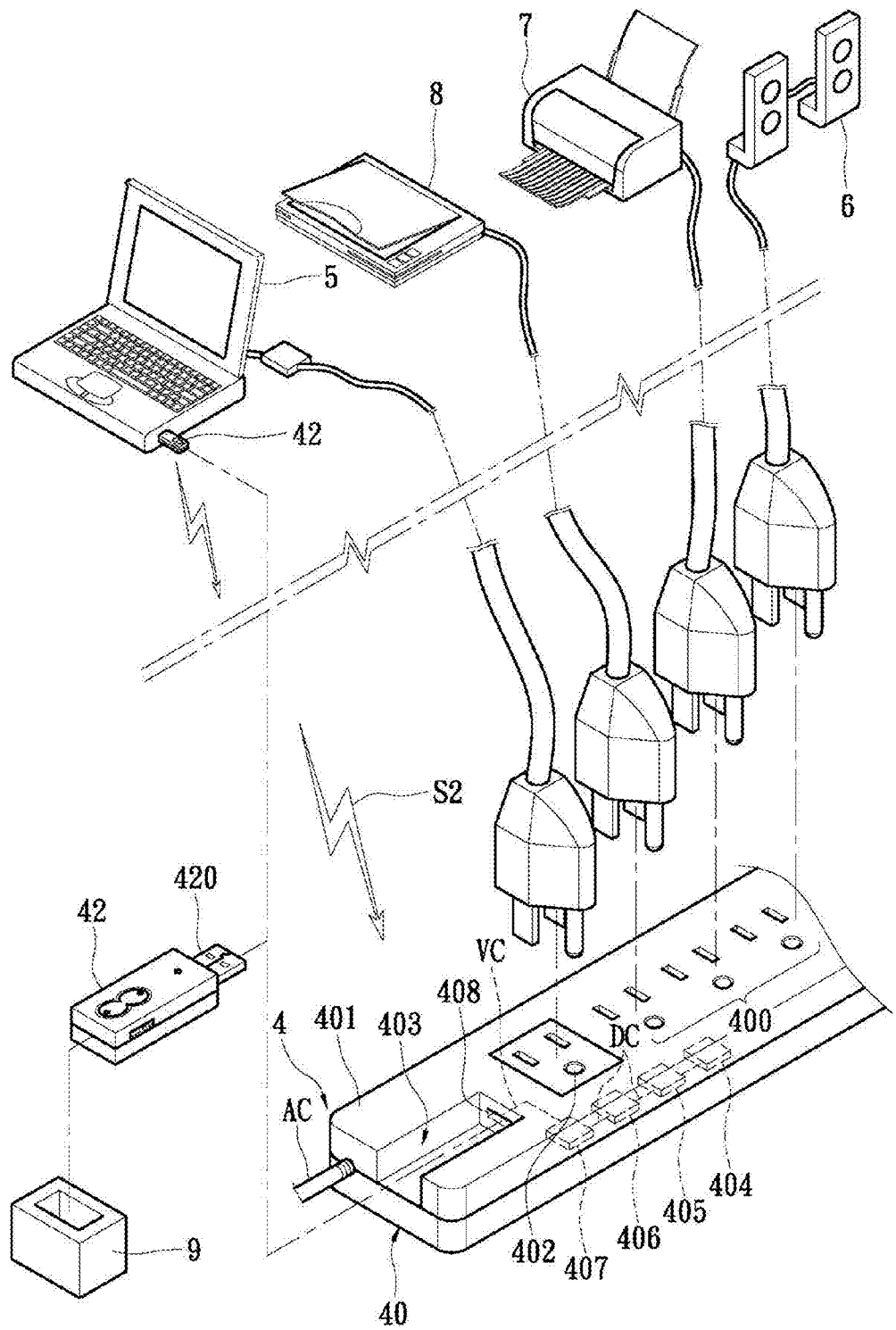
FIG. 3 is an outward appearance of the apparatus of the present invention.

Reference is made to FIG. 3 showing an outward appearance of the apparatus of the present invention. The wireless-controlled power-saving apparatus 4 shown in the figure includes a power-saving control strip 40 and a wireless power-detection controller 42. The power-saving control strip 40 has a receptacle 403 for containing the wireless power-detection controller 42. By plugging or other similar way, this wireless power-detection controller 42 can be contained in the power-saving control strip 40, or to be separated from the power-saving control strip 40. In the situation of the wireless power-detection controller 42 being contained in the strip 40, the power-saving control strip 40 may charge the wireless power-detection controller 42. Since the wireless power-detection controller 42 detects the power from the strip 40, at the moment, the wireless power-detection controller 42 may directly control the slave sockets 400 thereon. More, when the wireless power-detection controller 42 is separated from the power-saving control strip 40, the wireless power-detection controller 42 disposed in a container 9 controls the slave sockets 400 of the power-saving control strip 40 by means of wireless communication technology. In the current case, the wireless power-detection controller 42 separated from the power-saving control strip 40 can be plugged to an external host 5, and used to examine the host's work status. For example, the external host 5 may be a laptop computer, television, or a blu-ray multimedia player. In a preferred embodiment, the external host 5 is powered by the master socket 402 installed on the power-saving control strip 40, and the master socket 402 is a always-on socket.

When the external host boots up, the plugged-on wireless power-detection controller 42 can examine the power for the external host 5. Next, a wireless control signal S2 indicating the powered-on condition is transmitted to the power-saving control strip 40, so as to control the slave sockets on the power-saving control strip 40. Therethrough, the peripheral devices, such as speaker 6, printer 7, and scanner 8, connected to the power-saving control strip 40 are controlled to be powered. Otherwise, when the external host 5 shuts down, the wireless power-detection controller 42 detects the shut-down signal, and transmit a wireless control signal S2 indicating the shut-down condition to the power-saving control strip 40. Next, the slave sockets 400 of the strip 40 are controlled to be disconnected. Thus the peripheral devices connected to the slave sockets 400 are also cut off the power.

In the case, those peripheral devices connected to the slave sockets 400 are cut off the power while the external host 5 connected to the master socket 402 installed on the power-saving control strip 40 shuts down. Therefore, the wireless-controlled power-saving apparatus 4 of the present invention performs a master-slave-correlation operation by correlating the functions of the wireless power-detection controller 42 and the power-saving control strip 40.

The external host 5, such as laptop computer, television, and blu-ray multimedia player, may be the equipment having built-in batteries. According to the embodiment, the wireless power-detection controller 42 can control the devices connected to the slave sockets 400 by directly detecting the work status of the external host 5 without reliance on the master sockets of the power-saving control strip 40.

Figure 4:
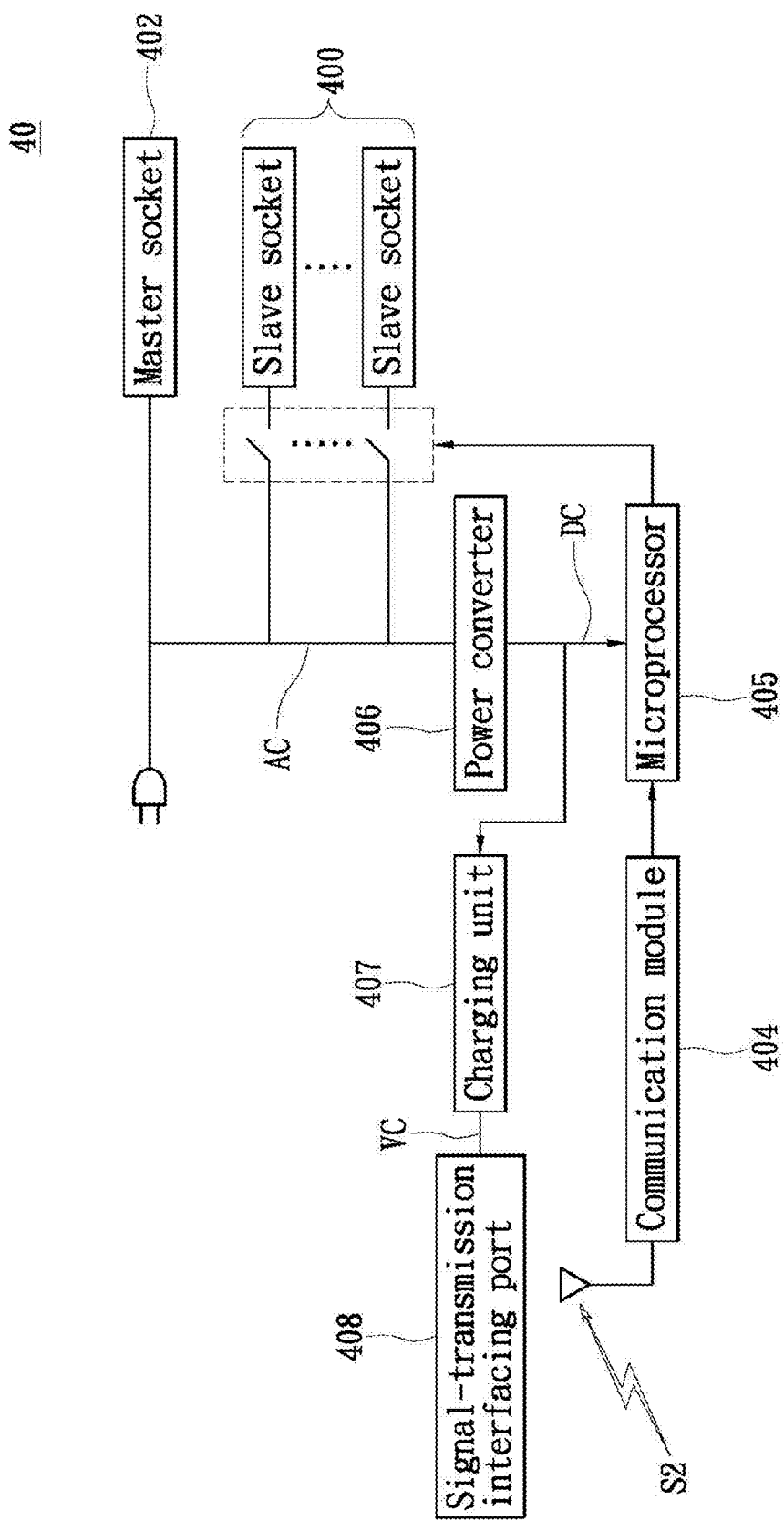
FIG. 4 shows a functional block diagram of the power-saving control strip of the present invention.

Reference is made to FIG. 3, and in view of FIG. 4. FIG. 4 shows a circuit block diagram of the claimed power-saving control strip. The power-saving control strip 40 connects to the wireless power-detection controller 42 by a wireless communication. The power-saving control strip 40 includes a housing 401, and a master socket 402 and at least one slave socket 400 are disposed thereon. The housing 401 has a communication module 404 and a microprocessor 405. The communication module 404 receives the wireless control signal S2 from the wireless power-detection controller 42. The microprocessor 405 couples to the communication module 404 and the slave socket(s) 400. Further, the microprocessor 405 controls the slave socket(s) 400 to be powered or disconnected simultaneously in response to the wireless control signal S2. The mentioned communication module 404 may be a wireless RF communication module, a Bluetooth communication, or an infrared communication module.

Referring again to the FIG. 3 and FIG. 4, the housing 401 of the power-saving control strip 40 includes a power converter 406, a charging unit 407, and a signal-transmission interfacing port 408. Therein the power converter 406 couples to the microprocessor 405 and the charging unit 407, and the converter 406 is used to convert an alternating current AC to a direct current DC. Then the direct current DC is transmitted to the microprocessor 405 and the charging unit 407. As the charging unit 407 receives the direct current DC, and accordingly outputs a charging current VC to the signal-transmission interfacing port 408. This charging current VC is in compliance with USB interfacing protocol in power. The charging current may also comply with other interfacing protocol, such as RS-232, RS-485, RS-422, HDMI, or IEEE 1394. By those protocols, the charging unit 407 can charge the wireless power-detection controller 42 contained in the power-saving control strip 40.

Figure 5:
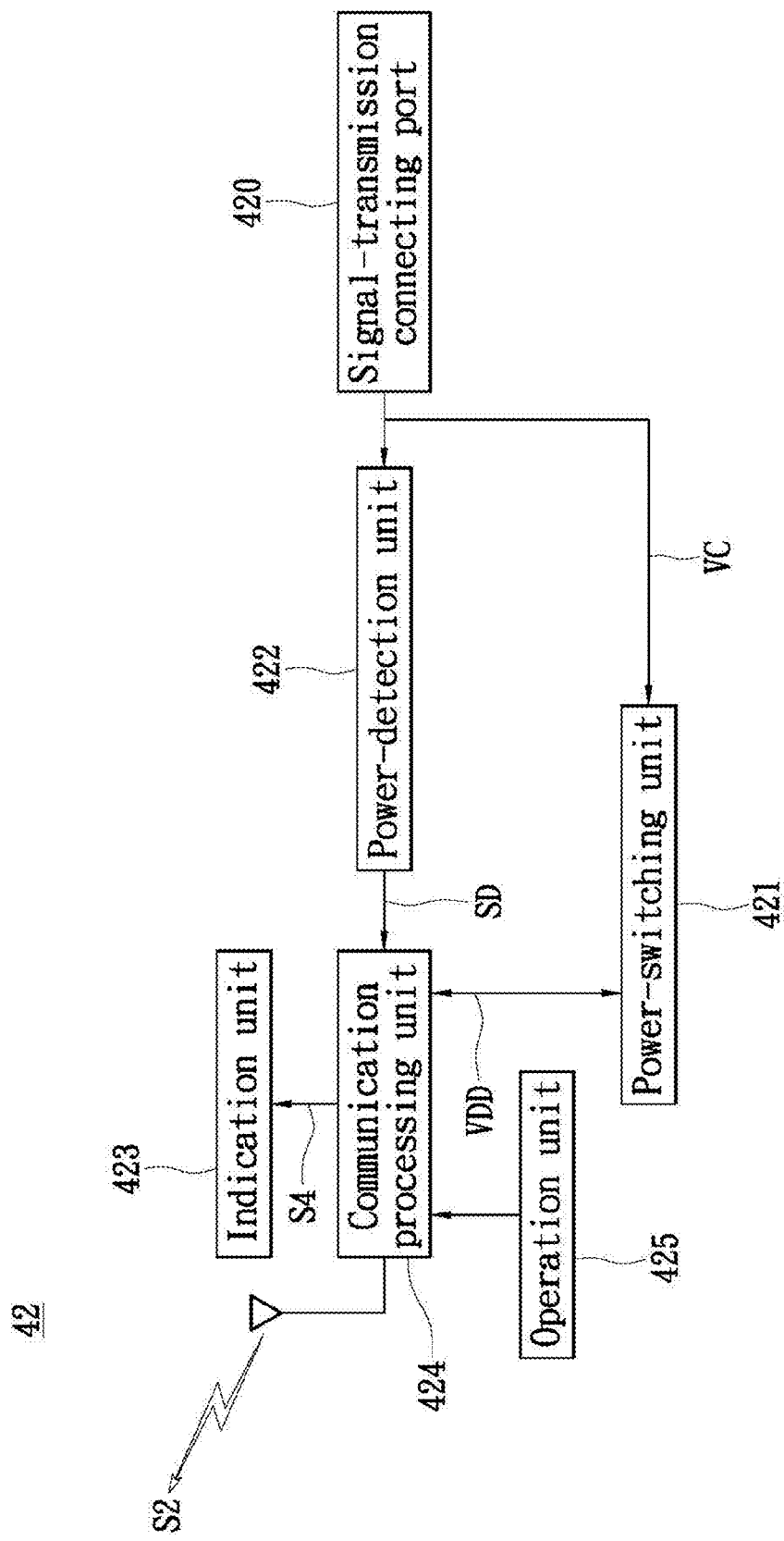
FIG. 5 shows a functional block diagram of the wireless power-detection controller of the present invention.

Reference is made to FIG. 3 in view of FIG. 5. A circuit block diagram of the claimed wireless power-detection controller is shown in FIG. 5. The wireless power-detection controller 42 connects to the power-saving control strip 40 by means of wireless communication technology. The wireless power-detection controller 42 further has a signal-transmission connecting port 420, a power-detection unit 422, and a communication processing unit 424. This communication processing unit 424 may be a wireless RF communication unit, a Bluetooth communication unit, or an infrared communication unit.

The signal-transmission connecting port 420 is used for the wireless power-detection controller 42 connecting to signal-transmission interfacing port (not shown in the figure) equipped for the external host 5. The power-detection unit 422 couples to the signal-transmission connecting port 420, and detects the work status of the external host 5 through the port 420. The work status includes the status of booting up or shutting down the host. Moreover, according to the detected work status, a detection signal SD, which indicates a boot-up signal or a shut-down signal, is generated. The communication processing unit 424 couples to the power-detection unit 422. Thereby, the communication processing unit 424 receives the detection signal SD, and outputs the wireless control signal S2 in response to the detection signal SD.

Reference is made to FIG. 3 and FIG. 5. The wireless power-detection controller 42 further includes a power-switching unit 421, an indication unit 423, an operation unit 425, and a signal-transmission connecting port 420. The power-switching unit 421 couples to the signal-transmission connecting port 420 and the communication processing unit 424, and receives the charging current VC through signal-transmission connecting port 420. Moreover, the power-switching unit 421 alternatively selects one power from the charging current VC and a battery (not shown in the figure) in response to the detection signal SD. The selected power is conducted as a work power VDD for providing power to the communication processing unit 424. The mentioned charging current VC is compliance with the USB interfacing protocol in power. Other interfacing protocol may be RS-232, RS-485, RS-422, HDMI, IEEE 1394 or other similar interfacing protocols. Particularly, the wireless power-detection controller 42 couples to the external host 5 through the signal-transmission connecting port 420 or the power-saving controls trip 40 through the signal-transmission interfacing port 408 (shown in FIG. 4). The related signal is retrieved from the external host 5 or the power-saving control strip 40.

Furthermore, when the power-switching unit 421 of the wireless power-detection controller 42 appears a low-power state, the communication processing unit 424 outputs a low-power signal S4 to the indication unit 423 according to the work power VDD. The indication unit 423 lights in response to the low-power signal S4, and indicates the power-detection controller 42 being a low-power state. This indication unit 423 may be a LED, or other lighting devices.

Again, reference is made to FIG. 3 and FIG. 5. The operation unit 425 couples to the communication processing unit 424. The operation unit 425 outputs a first control instruction, a second control instruction, or a time-control instruction to the communication processing unit 424. Those instructions are used to configure a work mode of the communication processing unit 424. The work mode can be a socket control mode, a master-slave socket control mode, a manipulation control mode, and a socket-time-control mode.

According to the preferred embodiment, the communication processing unit 424 may operate as the socket control mode in response to the first control instruction. When the communication processing unit 424 operates as the socket control mode, it outputs the wireless control signal S2 for controlling the slave socket(s) 400 of the power-saving control strip 40. Further, the communication processing unit 424 may operate as the master-slave socket control mode or the manipulation control mode in response to the second control instruction. When the communication processing unit 424 operates as the master-slave socket control mode, the wireless power-detection controller 42 automatically outputs the wireless control signal S2 in response to the external host's shutting down, so as to control the slave socket(s) 400 to be disconnected. Further, the wireless power-detection controller 42 automatically outputs the wireless control signal S2 responsive to the external lost's booting up, so as to control the slave socket(s) 400 to be powered. Moreover, when the communication processing unit 424 operates as the manipulation control mode, the wireless power-detection controller 42 manually outputs the wireless control signal S2, so as to control the slave socket(s) 400.

At the same time, the communication processing unit 424 may operate as a socket-time-control mode in response to the time-control instruction. When the communication processing unit 424 operates as the socket-time-control mode, the wireless power-detection controller 42 automatically outputs the wireless control signal S2 in a preset period in response to the external host's shutting down. So that the signal S2 is used to disconnect the slave socket(s) 400 of the power-saving control strip 40.

Figure 6:
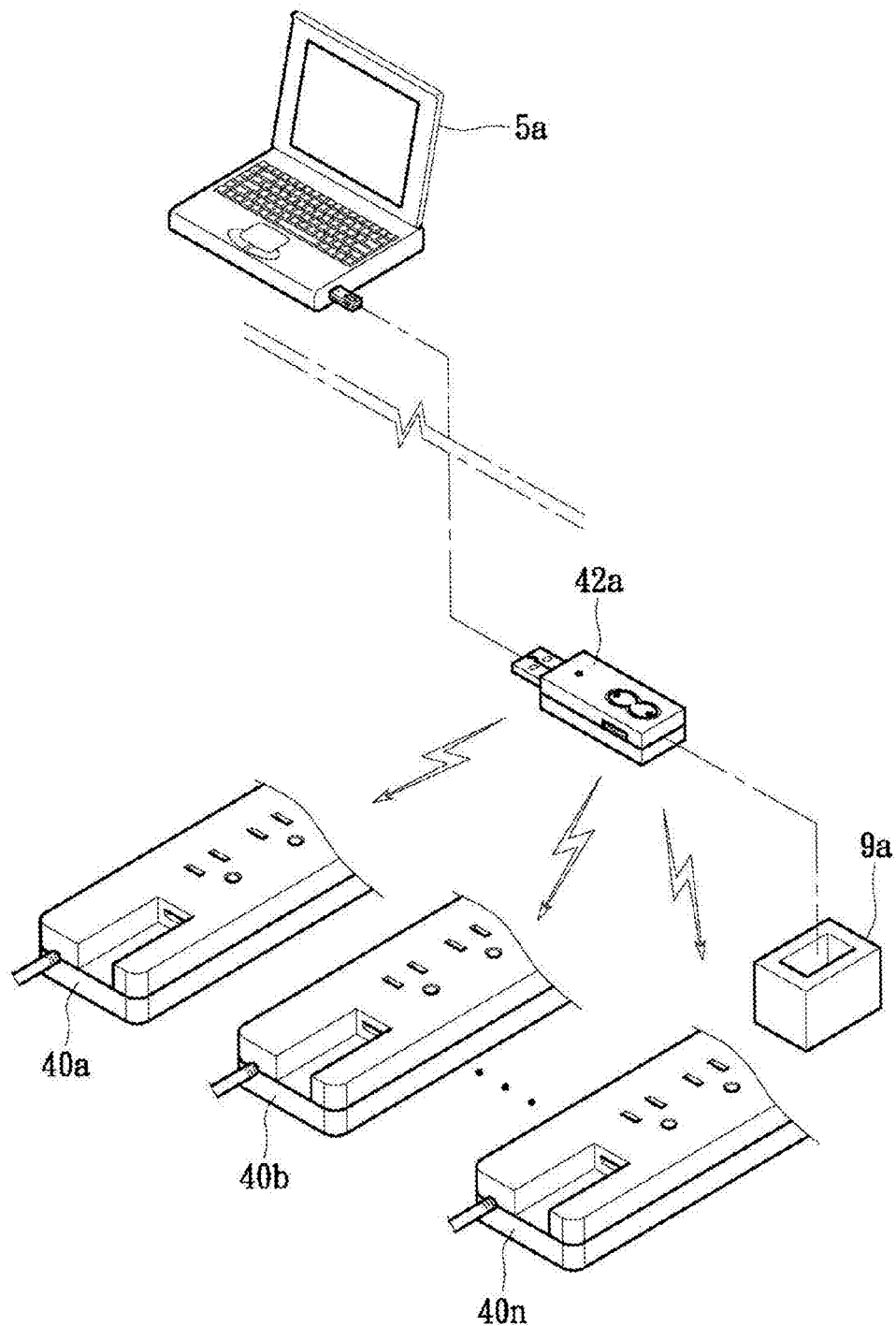
FIG. 6 is a schematic diagram of an application of the present invention.

Reference is made to FIG. 6 showing a preferred application of the present invention. A wireless power-detection controller 42a is disposed in a container 9a. By means of wireless communication technology, the controller 42a controls the slave sockets (not shown in FIG. 6) of multiple power-saving sockets 40a, 40b, . . . , 40n. The present invention achieves an expandable apparatus, and a one-to-multiple master-slave-correlation operation.

In the meantime, the wireless power-detection controller 42a can be plugged to an external host 5a, such as laptop computer, television, and blu-ray multimedia player, for detecting those hosts' work status. When the external host 5a boots up, the wireless power-detection controller 42a detects the power to the external host 5a, and controls the slave sockets to be powered. To the contrary, when the wireless power-detection controller 42a detects that the external host 5a shuts down, the controller 42a controls the slave sockets to be disconnected.

Thus the wireless power-detection controller 42a of the present invention may control the slave socket(s) installed on the power-saving control strip 40a, 40b . . . 40n by a one-to-multiple remote controlling means. This scheme can operate on a plurality of sets of the master-slave-correlation sockets.

In the summation of above description, the wireless-controlled power-saving apparatus integrates a power-saving control strip and a wireless power-detection controller. In which, the controller is used to detect the work status of an external host, and response the status to the power-saving control strip by means of wireless communication technology. Thus, the wireless power-detection controller outputs the wireless control signal indicating the booting-up status to the power-saving control strip when the external host boots up. Then the slave sockets installed on the strip are powered simultaneously. Otherwise, the controller controls the slave sockets to be disconnected when the external host shuts down.

After that, the present invention is conducted to achieve the master-slave-correlation operation. Thus the claimed wireless-controlled power-saving apparatus can solve the problems concerning the convenience, safety and power-saving management, and further meet the Standby-Power requirement.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A power-saving control strip which communicates with a wireless power-detection controller, comprising:
   a housing, disposing of a master socket and at least one slave socket to be controlled, the housing further having a receptacle for containing the wireless power-detection controller;
   a communication module, disposed in the housing, wherein the communication module receives a wireless control signal from the wireless power-detection controller; and
   a microprocessor, disposed in the housing, wherein the microprocessor couples to the communication module and at least one slave socket, and controls the one or more slave sockets to be powered or disconnected in response to the wireless control signal.

2. The power-saving control strip of claim 1, further comprising a power converter, wherein the power converter couples to the microprocessor, and converts an alternating current into a direct current, and transfers the direct current to the microprocessor.

3. The power-saving control strip of claim 2, further comprising a charging unit that couples to the power converter, wherein the charging unit receives the direct current and outputs a charging power.

4. The power-saving control strip of claim 3, further comprising a signal-transmission interfacing port that couples to the charging unit, and receives the charging power.

5. The power-saving control strip of claim 1, wherein the communication module is the one selected from a wireless RF communication module, a Bluetooth communication module, and an infrared communication module.

6. A wireless power-detection controller which communicates with a power-saving control strip, comprising:
   a signal-transmission connecting port providing the wireless power-detection controller to connected to an external host;
   a power-detection unit coupled to the signal-transmission connecting port, and the power-detection unit detects whether the external host boots up or not through the signal-transmission connecting port, and outputs a detection signal; and a communication processing unit coupled to the power-detection unit, wherein the communication processing unit receives the detection signal, and outputs a wireless control signal to the power-saving control strip in response to the detection signal.

7. The controller of claim 6, further comprising a power-switching unit coupled to the signal-transmission connecting port and the communication processing unit, wherein the power-switching unit receives a charging power through the signal-transmission connecting port, and alternatively outputs the charging power or a battery power in response to the detection signal, so as to provide a work power to the communication processing unit's use.

8. The controller of claim 7, wherein the communication processing unit further couples to an indication unit, and the communication processing unit outputs a low-power signal to the indication unit.

9. The controller of claim 6, wherein the communication processing unit further couples to an operation unit, wherein the communication unit receives a first control instruction from the operation unit, and controls the power-saving control strip in response to the first control instruction.

10. The controller of claim 9, wherein the communication processing unit receives a second control instruction from the operation unit, and controls to transmit the wireless control signal in response to the second control instruction.

11. The controller of claim 10, wherein the communication processing unit receives a time-control instruction from the operation unit, and controls the power-saving control strip in response to the time-control instruction.

12. The controller of claim 6, wherein the communication processing unit is the one selected from a wireless RF communication processing unit, a Bluetooth communication processing unit, and an infrared communication processing unit.

13. A wireless-controlled power-saving apparatus, comprising:
    a wireless power-detection controller, having:
        a signal-transmission connecting port providing the wireless power-detection controller to connect to an external host;
        a power-detection unit coupled to the signal-transmission connecting port, wherein the power-detection unit detects whether the external host boots up or not through the signal-transmission connecting port, and outputs a detection signal;
        a communication processing unit coupled to the power-detection unit, wherein the communication processing unit receives the detection signal, and outputs a wireless control signal in response to the detection signal;
    a power-saving control strip communicated with the wireless power-detection controller, having:
    a housing disposing of a mater socket and at least one slave socket, and the housing includes a receptacle used for containing the wireless power-detection controller;
        a communication module disposed in the housing, and the communication module receives the wireless control signal; and
        a microprocessor disposed in the housing, wherein the microprocessor couples to the communication module and at least one slave socket, and controls the at least one slave socket to be powered or disconnected simultaneously.

14. The apparatus of claim 13, wherein the power-saving control strip comprises:
    a power converter coupled to the microprocessor, wherein the power converter converts an alternating power into a direct power and transmits the direct power to the microprocessor;
    a charging unit coupled to the power converter, wherein charging unit receives direct power and outputs a charging power; and
    a signal-transmission interfacing port coupled to the charging unit, wherein the signal-transmission interfacing port receives the charging power.

15. The apparatus of claim 14, wherein the signal-transmission interfacing port of the power-saving control strip couples to the signal-transmission connecting port of the power-detection controller, and the power-saving control strip electrically charges the wireless power-detection controller.

16. The apparatus of claim 15, wherein the wireless power-detection controller further comprises a power-switching unit coupled to the signal-transmission connecting port and the communication processing unit, wherein the power-switching unit receives the charging power through the signal-transmission connecting port, and alternatively outputs the charging power or a battery power in response to the detection signal, so as to provide a work power to the communication processing unit.

17. The apparatus of claim 16, wherein the communication processing unit couples to an indication unit, wherein the communication processing unit outputs a low-power signal to the indication unit.

18. The apparatus of claim 13, wherein the communication processing unit couples to a operation unit, wherein the communication processing unit receives a first control instruction from the operation unit, and controls at least one slave socket of the power-saving control strip in response to the first control instruction.

19. The apparatus of claim 18, wherein the communication processing unit receives a second control instruction from the operation unit, and controls to transmit the wireless control signal in response to the second control instruction.

20. The apparatus of claim 19, wherein the communication processing unit receives a time-control instruction from the operation unit, and control the slave socket of the power-saving control strip in response to the time-control instruction.

* * * * *